(12) United States Patent
Murphy

(10) Patent No.: US 7,866,158 B2
(45) Date of Patent: Jan. 11, 2011

(54) EXHAUST LINER ATTACHMENT ARRANGEMENT

(75) Inventor: Michael Joseph Murphy, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 546 days.

(21) Appl. No.: 11/950,956

(22) Filed: Dec. 5, 2007

(65) Prior Publication Data

US 2009/0145133 A1 Jun. 11, 2009

(51) Int. Cl.
*F02K 1/00* (2006.01)
(52) U.S. Cl. ........................................ 60/770; 60/796
(58) Field of Classification Search .................. 60/770, 60/771, 796–798; 239/265.11; 29/899.22
See application file for complete search history.

(56) References Cited

U.S. PATENT DOCUMENTS

| 4,800,718 | A | 1/1989 | Zimmerman |
| 4,887,663 | A | 12/1989 | Auxier et al. |
| 5,328,327 | A * | 7/1994 | Naudet ........................ 415/160 |
| 5,571,262 | A * | 11/1996 | Camboulives .......... 239/265.39 |
| 5,592,814 | A | 1/1997 | Palusis et al. |
| 5,720,434 | A | 2/1998 | Vdoviak et al. |
| 5,755,093 | A | 5/1998 | Palusis et al. |
| 5,775,589 | A | 7/1998 | Vdoviak et al. |
| 6,901,757 | B2 | 6/2005 | Gerendas |
| 7,032,835 | B2 | 4/2006 | Murphy et al. |
| 7,581,399 | B2 * | 9/2009 | Farah et al. .................... 60/770 |

* cited by examiner

*Primary Examiner*—Michael Cuff
*Assistant Examiner*—Phutthiwat Wongwian
(74) *Attorney, Agent, or Firm*—Carlson, Gaskey & Olds, P.C.

(57) ABSTRACT

A turbine engine exhaust nozzle is disclosed that includes an exhaust liner having a first attachment structure. A liner support member includes a second attachment structure. A pin cooperates with the first and second attachment structures and is configured to secure the exhaust liner relative to the liner support member. The pin includes first and second dimensions that are different than one another. The pin is inserted into apertures provided by the attachment structures, in one example. The pin is oriented to position the first and second dimensions in a manner providing increased clearance within the apertures. The pin is rotated to load the components and firmly secure the liner to the liner support member.

6 Claims, 2 Drawing Sheets

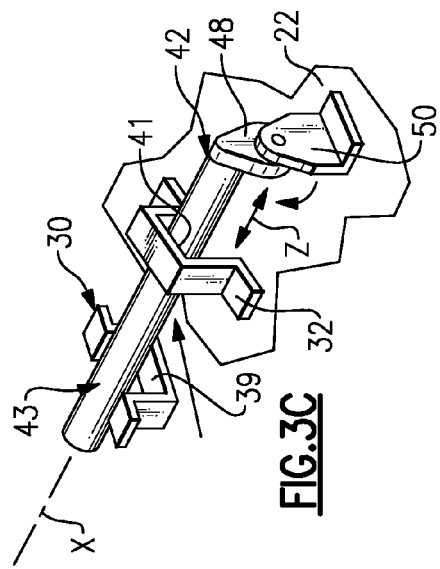
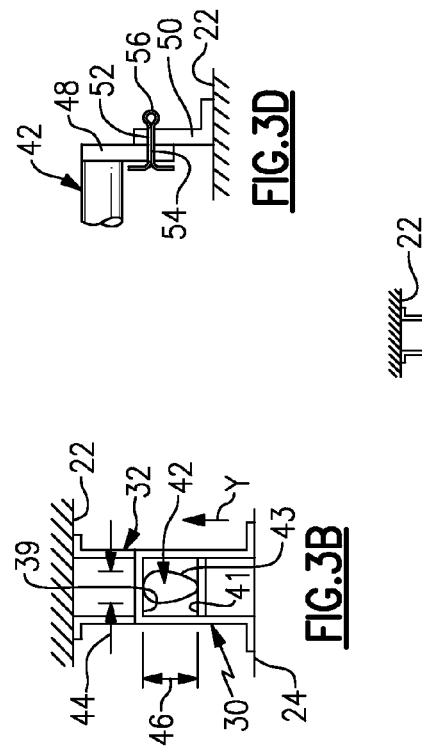
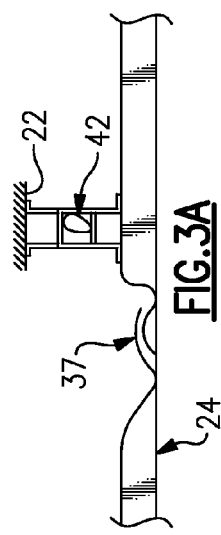
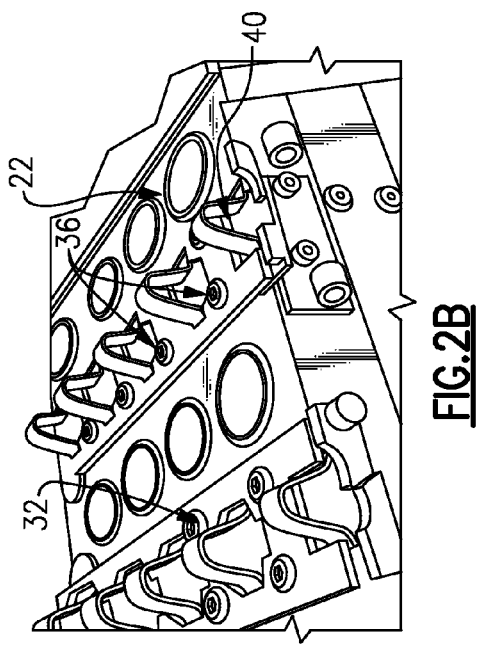
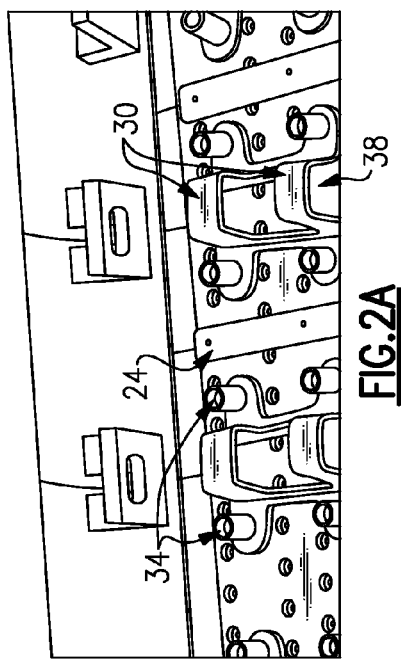

EXHAUST LINER ATTACHMENT ARRANGEMENT

This invention was made with government support with the United States Navy under Contract No.: N00019-02-C-3003. The government therefore has certain rights in this invention.

BACKGROUND

This disclosure relates to an attachment arrangement for supporting an exhaust liner relative to an exhaust duct of a gas turbine engine. The disclosure also relates to a method of securing and removing the exhaust liner relative to the exhaust duct.

Turbojet engines typically include a removable exhaust liner that is secured and supported relative to an exhaust duct. In one type of arrangement, brackets are associated with each of the exhaust liner and the exhaust duct. The brackets include corresponding apertures. A round pin is inserted through the apertures, which are aligned during assembly, to support the exhaust liner relative to the exhaust duct.

Due to the complicated nature of the liner flow path and manufacturing tolerances, securing the exhaust liner to the exhaust duct can be difficult. Assembly is also difficult due to large tolerance stack-ups and the desire to preload the exhaust components relative to one another to prevent undesired vibrations during engine operation. Additionally, when disassembling and reassembling previously run exhaust nozzles, thermal warping can make the removal and reassembly process even more difficult. What is needed is an arrangement and method for securing the exhaust liner relative to the exhaust duct while providing desired loading between the exhaust components.

SUMMARY

A turbine engine exhaust nozzle is disclosed that includes an exhaust liner having a first attachment structure. A liner support member, such as an exhaust duct, includes a second attachment structure. A pin cooperates with the first and second attachment structures to secure the exhaust liner relative to the liner support member. The pin includes first and second dimensions that are different than one another. The pin is inserted into apertures provided by the attachment structures, in one example. The pin is arranged such that the first dimension is in a desired orientation to provide increased clearance in an unsecured condition. The pin is rotated to orient the second dimension as desired for loading exhaust components and firmly secure the exhaust liner to the liner support member, in a secured condition.

These and other features of the application can be best understood from the following specification and drawings, the following of which is a brief description.

BRIEF DESCRIPTION OF THE DRAWINGS

FIG. 2A is a perspective view of one side of an exhaust liner.

FIG. 2B is a perspective view of one side of a duct structure that faces the side of the exhaust liner shown in FIG. 2A when assembled to one another.

FIG. 3A is a cross-sectional view of the exhaust liner and duct structure with a pin in an unsecured position.

FIG. 3B is an enlarged cross-sectional view of the arrangement shown in FIG. 3A with the pin in a secured position.

FIG. 3C is a perspective view of the pin in the secured position shown in FIG. 3B.

FIG. 3D is a cross-sectional view of the pin as shown in FIG. 3C at line 3D.

DETAILED DESCRIPTION

Figure 1:
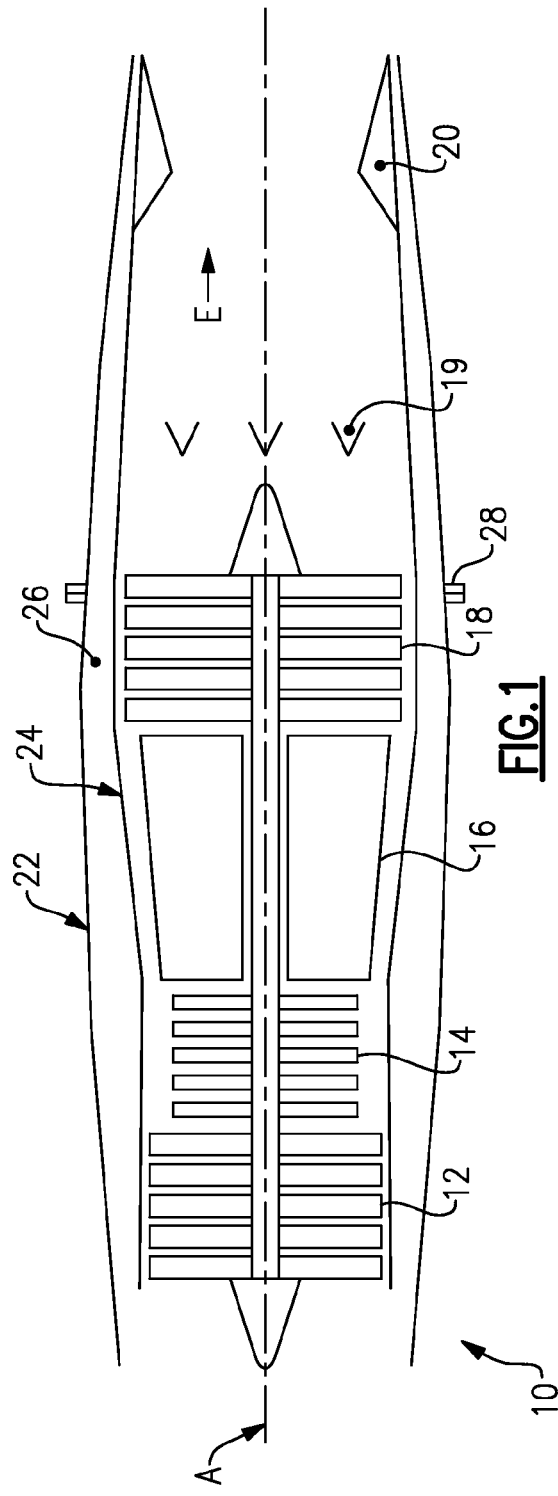
FIG. 1 is a highly schematic view of an example turbojet engine.

FIG. 1 illustrates an example turbojet engine 10. The engine 10 generally includes a fan section 12, a compressor section 14, a combustor section 16, a turbine section 18, an augmentor section 19 and a nozzle section 20. The compressor section 14, combustor section 16 and turbine section 18 are generally referred to as the core engine. An axis A of the engine 10 is generally disposed and extends longitudinally through the sections. An outer engine duct structure 22 and an inner cooling liner structure 24, or exhaust line F, provide an annular secondary fan bypass flow path 26 around a primary exhaust flow path E. In the example, the duct structure 22 acts as a liner support member.

An example arrangement for supporting the exhaust liner 24 relative to the duct structure 22 is illustrated in FIGS. 2A-3D. Referring to FIG. 2A, the exhaust liner 24 includes multiple first support members 30 secured to the exhaust liner 24 by fastening elements 34. The first support members 30 include first apertures 38. Referring to FIG. 2B, the duct structure 22 includes multiple second support members 32 secured to the duct structure by second fastening elements 36. The second support member 32 includes second apertures 40. In one example, the first and second support members 30, 32 are generally U-shaped hanger brackets arranged adjacent to one another in an alternating relationship. At least portions of the first and second apertures 38, 40 are generally aligned with one another when assembled.

The exhaust liner 24 is typically provided by multiple liner segments that adjoin one another and are arranged in an overlapping fashion at liner seals 37, which prevents exhaust gases from entering a space 35 provided between the exhaust liner 24 and duct structure 22, as shown in FIG. 3A.

Referring to FIGS. 3A-3C, a pin 42 is disposed within the first and second apertures 38, 40 to secure the exhaust liner 24 relative to the duct structure 22. Typically, the prior art cross-sectional profile of the pin is circular. In the example shown the Figures, the pin 42 has a non-circular cross-section. In one example, the pin 42 includes first and second dimensions, or widths, 44, 46 that are different than one another. In the example, the first width 44 (minor axis) is smaller than the second width 46 (major axis), which facilitates easier insertion and removal of the pin 42 in directions Z during assembly and disassembly of the exhaust liner 24 relative to the duct structure 22.

As shown in FIG. 3A, the pin 42 is oriented in a desired rotational position so as to provide a smaller cross-sectional dimension that enables easier insertion and removal of the pin 42 by providing increased clearance. The profile 43 of the pin 42, which is oval or cam-shaped for example, cooperates with first and second surfaces 39, 41 that are respectively provided by the first and second support members 30, 32 to load the exhaust liner 24 and duct structure 22 relative to one another. As the pin 42 is rotated about an axis X, the width of the profile 43 increases between the first and second surfaces 39, 41 thereby loading the exhaust components and moving the exhaust liner 24 toward the duct structure 22 in a direction Y, which is best shown in FIG. 3B. Loading the exhaust components seals adjacent exhaust liners 24 to one another and minimizes vibrations.

In one example, the pin 42 is rotated less than 180° about the axis X to provide the unsecured and secured positions. The pin 42 is arranged generally parallel to the exhaust liner 24 and duct structure 22 surfaces that provide the space 35. In one example, the first width 44 is oriented within the first and second apertures 38, 40 such that the first width 44 is generally perpendicular to the first and second surfaces 39, 41 to provide the greatest amount of clearance. The pin 42 is rotated approximately 90° about the axis X to provide the least amount of clearance between the pin 42 and the first and second support members 30, 32 in the direction perpendicular to the first and second surfaces 39, 41.

Once the pin 42 has been rotated to a secured position, shown in FIGS. 3B-3D, it is desirable to retain the pin 42 with a locking feature to prevent undesired rotation of the pin 42 back to an unsecured position. To this end, the pin 42 includes an arm 48 that cooperates with a bracket 50 provided on the duct structure 22, for example. As shown in FIG. 3D, the arm 48 and bracket 50 are positioned to align corresponding holes 52, 54 with one another in the secured position. A retainer 56 is inserted in the holes 52, 54 to retain the pin 42 in the secured position.

Figure 4:
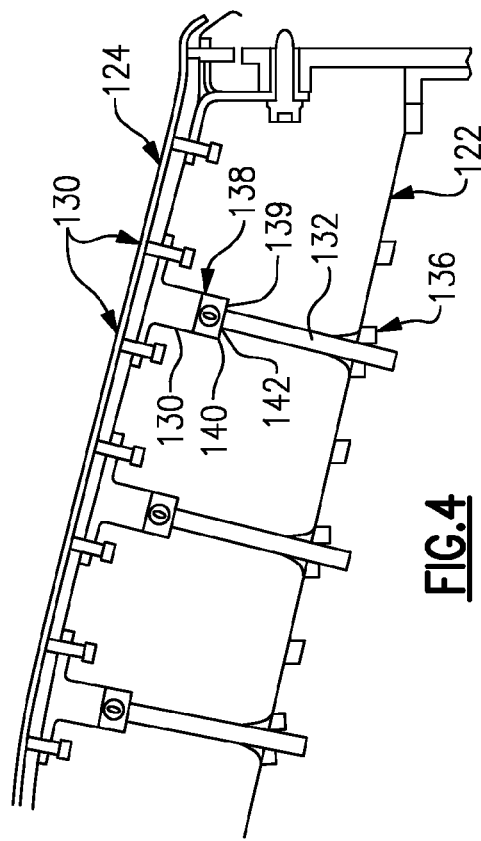
FIG. 4 is a cross-sectional view of another exhaust liner and duct structure arrangement.

Another example exhaust liner 124 and duct structure 122 is shown in FIG. 4. The second support member 132 is secured to the duct structure 122 by a fastening element 136. A second aperture 140 is provided at an end portion of the second support member 132, which is a rod-like structure in the example. The first support member 130 is secured to the exhaust liner 124 by fastening elements 130. The first aperture 138 is provided by the first support member 130. The pin 142 is received within the first and second apertures 138, 140. The pin 142 is rotated from the unsecured position to the secured position in which the larger dimension of the pin 142 engages the surface 139 of the first support member 130, thus loading the exhaust liner 124 and duct structure 122.

Although example embodiments have been disclosed, a worker of ordinary skill in this art would recognize that certain modifications would come within the scope of the claims. For that reason, the following claims should be studied to determine their true scope and content.

What is claimed is:

1. A turbine engine exhaust nozzle comprising:
   a exhaust liner including a first attachment structure;
   a liner support member including a second attachment structure; and
   a pin extending along a pin axis and cooperating with the first and second attachment structures and configured to secure the exhaust liner relative to the liner support member; the pin including first and second dimensions that are different than one another and respectively correspond to first and second rotational positions about the pin axis, the first and second rotational positions corresponding to unsecured and secured liner conditions, wherein the first and second attachment structures each include surfaces opposing one another, the profile engaging the opposing surfaces and applying a load to the first and second attachment structures in the second rotational position greater than a load in the first rotational position.

2. The turbine engine exhaust nozzle according to claim 1, wherein the pin includes a generally cam-shaped profile in a cross-section that is perpendicular to a rotational axis about which the pin rotates between the first and second rotational positions, the profile providing the first and second dimensions, the first dimension smaller than the second dimension.

3. The turbine engine exhaust nozzle according to claim 1, wherein the exhaust liner and line support member are closer to one another in the secured liner condition than in the unsecured liner condition.

4. The turbine engine exhaust nozzle according to claim 1, comprising multiple first and second attachment structures arranged in an alternating relationship to one another, the first and second attachment structures including first and second apertures respectively, the apertures aligned with one another and the pin received in the apertures.

5. The turbine engine exhaust nozzle according to claim 1, comprising a locking feature maintaining the pin in the second rotational position.

6. The turbine engine exhaust nozzle according to claim 5, wherein the locking feature includes an arm extending from the pin and a retainer securing the arm to a bracket supported by the liner support member.

* * * * *